No. 675,158. Patented May 28, 1901.
A. S. HUBBARD.
SYSTEM OF ELECTRICAL DISTRIBUTION.
(Application filed Apr. 5, 1900.)
(No Model.) 3 Sheets—Sheet 1.

WITNESSES:
M. Wheddon
J. Green

INVENTOR
Albert S. Hubbard
BY
ATTORNEYS

No. 675,158. Patented May 28, 1901.
A. S. HUBBARD.
SYSTEM OF ELECTRICAL DISTRIBUTION.
(Application filed Apr. 5, 1900.)

(No Model.) 3 Sheets—Sheet 3.

WITNESSES:
M Wheddon
J Green

INVENTOR
Albert S Hubbard
BY
ATTORNEYS

UNITED STATES PATENT OFFICE.

ALBERT S. HUBBARD, OF BELLEVILLE, NEW JERSEY, ASSIGNOR TO CHARLES A. GOULD, OF PORT CHESTER, NEW YORK.

SYSTEM OF ELECTRICAL DISTRIBUTION.

SPECIFICATION forming part of Letters Patent No. 675,158, dated May 28, 1901.

Application filed April 5, 1900. Serial No. 11,657. (No model.)

*To all whom it may concern:*

Be it known that I, ALBERT S. HUBBARD, a citizen of the United States, residing at Belleville, in the county of Essex and State of New Jersey, have invented certain new and useful Improvements in Systems of Electrical Distribution, of which the following is a specification.

This invention relates to improvements in systems of electrical distribution, said improvements being designed to enable the electric energy developed in an alternating dynamo or circuit to be distributed in branch circuits in unidirectional impulses.

My invention is based on the use of electrochemical rectifying devices, such as the aluminium and carbon cell, which have the property of restricting the passage of current to impulses in one direction, only such current, for example, being allowed to pass with which the aluminium terminal constitutes the cathode.

My invention enables the rectification of impulses in both directions, generated by an alternating-current dynamo, by the provision of two branches or circuits containing such electrochemical rectifying devices oppositely placed, so that impulses in one direction are directed through one of such branch circuits, while the opposite impulses pass through the other branch. Such branch circuits may be arranged as the two sides of a three-wire circuit, whether a working circuit, a battery-circuit, or a field-circuit, or one may be a working circuit and the other a field-circuit.

My invention is particularly intended for application in car-lighting systems and presents material advantages in such connection in the economy and reliability of operation, inasmuch as the use of a commutator is avoided, and in ordinary car-lighting systems a large part of the cost of maintenance and repair is caused by the commutator.

Figure 1:
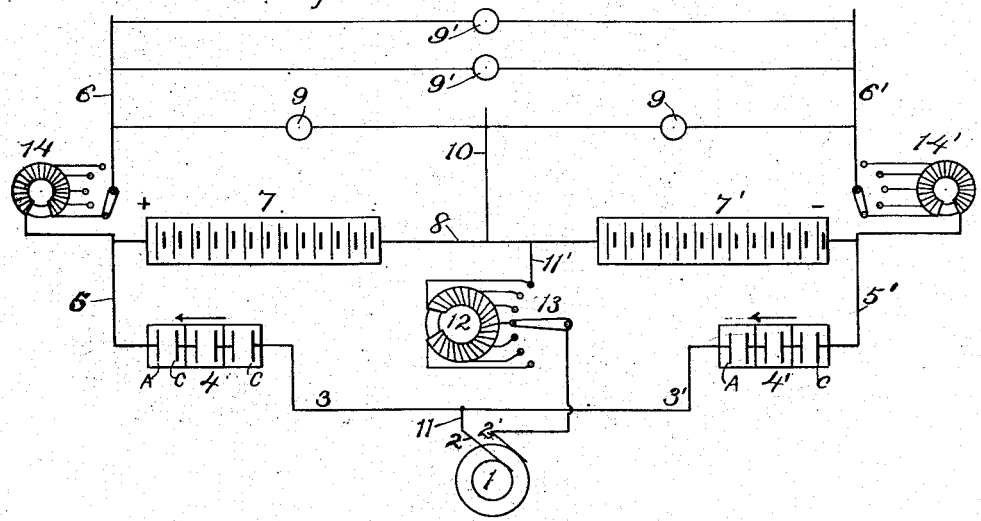
Figure 2:
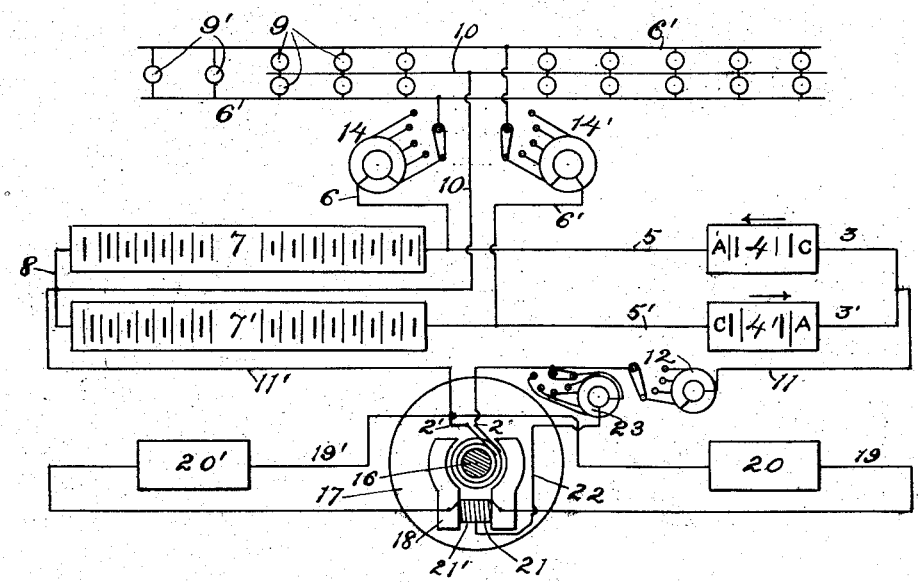
Figure 3:
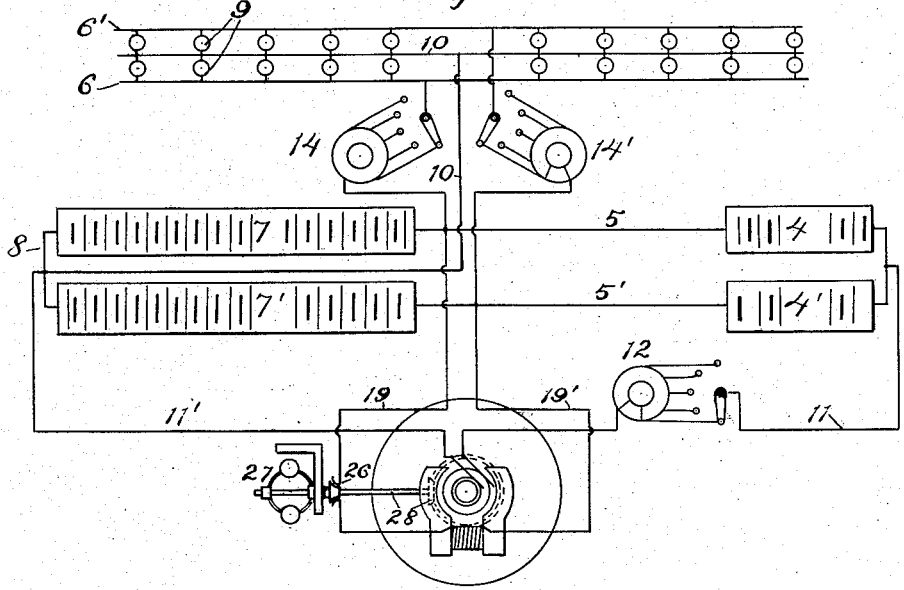

In the accompanying drawings, Figure 1 is a diagram illustrating the general principle of my invention. Fig. 2 is a diagram showing the complete circuit connections of a system embodying my invention applied to car-lighting. Figs. 3 to 6 show modified arrangements of the system.

Referring to Fig. 1, an alternating-current generator or source of alternating current of any usual or suitable form is indicated at 1, one of the terminals 2 of this alternator being connected to a lead 11, which divides into two branch circuits 3 3', leading to the respective electrochemical rectifying-cells 4 4', whose outer terminals are connected by wires 5 5' to the main leads or wires 6 6' of the working or consumption circuit. To these main connections 6 6' are connected the outer ends of two storage batteries 7 7', the inner ends of such batteries being connected together by wire 8. Translating devices 9 may be connected directly across, as indicated at 9', between the outer wires or connections 6 6', or they may be arranged, as shown at 9, on the three-wire system, with the intermediate wire 10 connected back to the intermediate connection 8 of the batteries. From such intermediate connection 8 a return-wire 11' leads back to the other terminal 2' of the alternating-current dynamo. This return-wire 11' should be provided with a choking-coil 12, whose effect is regulated by adjusting-switch 13, and adjustable choke-coils 14 14' should be located in each of the working leads 6 6' of the work-circuit, as indicated.

Each of the electrochemical rectifying devices above referred to may consist of an electrolytic cell or of a series of electrolytic cells of such nature as to oppose passage of current of one direction, but to permit passage of current of opposite direction, each of such cells comprising an aluminium electrode or its equivalent that has the property of allowing a current to pass only when the aluminium electrode acts as a cathode with such current. Thus in the drawings the aluminium and carbon electrodes (marked, respectively, A and C) are so arranged that in branch circuit 3' the connection from the dynamo is to an aluminium electrode. The direction of the current which will then be permitted to pass in each branch circuit 3 or 3' is indicated by the arrows, and these currents are directed oppositely as regards the dynamo. Thus the alternating opposite impulses from the dynamo are directed, respectively, into the two branch circuits 3 3' and pass to the respective sides of the working circuit. The storage batteries 7 7' receive these impulses as unidirectional currents, and the working circuit 6 6' receives from the branch currents 3 3' and from the said batteries a comparatively steady unidirectional current, the storage batteries furnishing the energy during the intervals when the corresponding branch circuits are inactive. The choke-coils 14 14' further conduce to the steadiness of the current in the working circuit, and a similar result is effected by the choke-coil 12 in the return connection 11'. It will be noted that this return connection carries impulses in both directions, and the adjustable choke-coil 12 therein serves also to regulate the effective electromotive force delivered to the storage batteries.

While the electrochemical rectifiers are in parallel relation with reference to their inclusion in the divided circuit leading from the dynamo to the working circuit, the said rectifiers are in series with one another in a circuit traced across from side to side of the working current, with a connection to the dynamo from a point intermediate between the rectifiers.

In practice it will be necessary to provide the field-magnet of the alternator with unidirectional exciting-current. Such current may be derived from the storage batteries 7 7' or from an auxiliary rectifying-circuit arranged in duplicate, like the main circuit above described. Such an arrangement is illustrated in Fig. 2, which also shows the application of the invention to a car-lighting system. The armature of the alternator 1 is here shown as mounted on and driven by an axle 16 of a car-truck, one of the wheels of which is indicated at 17. From one side 2 of the alternator the wire 11 and the two branch circuits 3 3' lead through the respective electrochemical rectifying devices 4 4' to the two sides of the work-circuit 6 6' and to the two storage batteries 7 7', the return-wire 11' from the work-circuit, and the storage batteries 7 7' leading back to the other side 2' of the alternator. The lamps 9 9 are shown as connected on the three-wire system between the wires 6 6', the intermediate wire 10 leading back to the return-wire 11'; but instead of such an arrangement lamps of high voltage may be connected directly across between the leads 6 6', as indicated at 9'. The choke-coils 12 14 are arranged in the connections 11 6 6', and the operation, as far as concerns the working and battery circuits, is the same as in Fig. 1. The polarity of the electrochemical rectifying-cells is indicated by the letters A C, placed thereon, the arrows indicating the permissive direction of current in the respective cells. To excite the field-magnet 18 of the alternator 1, an auxiliary circuit is provided, consisting of branch wires 19 19', leading from one side of the alternator and including, respectively, the oppositely-placed electrochemical rectifying devices 20 20', to the two halves 21 21' of the field-magnet winding, the junction-point of these two half-windings being connected back by wire 22 to the other side 2' of the alternator or source of alternating current. This return connection includes an adjustable choke-coil 23 to enable regulation of the field-current and steady the same. By the described arrangement the alternating impulses from the dynamo are alternately diverted through one or the other of the halves of the field-winding, the electrochemical cells 20 20' being so placed that current can only flow therein in the direction of the arrows. The result is that all the impulses pass through the field-windings in the same circumferential direction, so that a continuous magnetizing effect is produced. The field magnetization may be produced, as stated, by current derived from the storage batteries or from the rectified portion of the main circuit of the generator. Thus in Fig. 3 the field-exciting current 19 19' leads to the field-winding 21 from the wires 5 5', between the electrochemical rectifiers 4 4' and the storage batteries 7 7'. A circuit-breaker 26 is shown as included in this exciting-circuit and is controlled by a governor 27, connected by mechanical connections 28 to the shaft or axle 16 of the alternator, so as to be responsive to the speed of the alternator to cut off the exciting connection when the alternator is at rest or is below normal speed.

Figure 4:
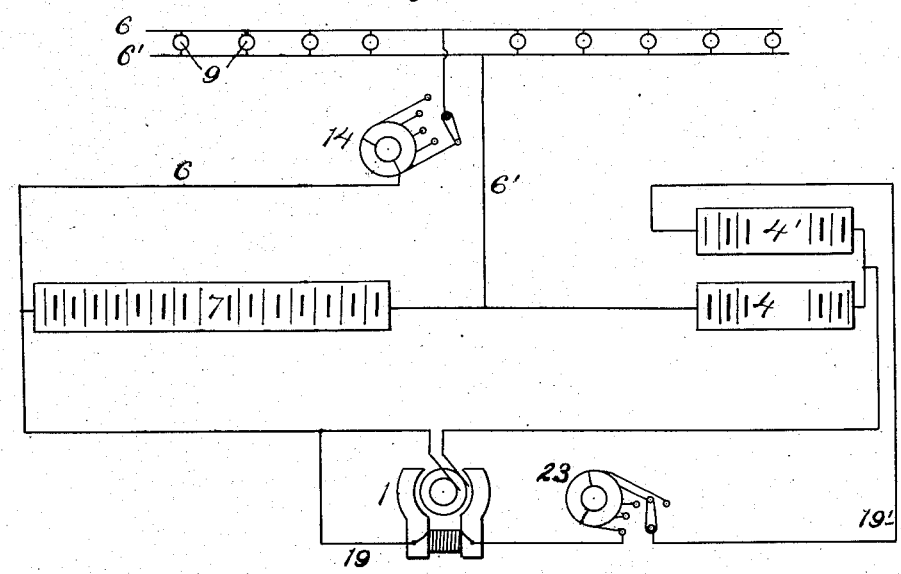

In Fig. 4 a system is shown wherein the division of the alternating impulses is made between the field-magnet circuit on the one hand and the working circuit with the storage battery on the other hand. The working circuit 6 6', with the translating devices 9 and the storage battery 7, connected across it, is connected in parallel relation with the field-magnet circuit 19 19', the said two circuits including the respective regulating choking-coils 14 23 and the respective electrochemical rectifiers 4 4'.

Figure 5:
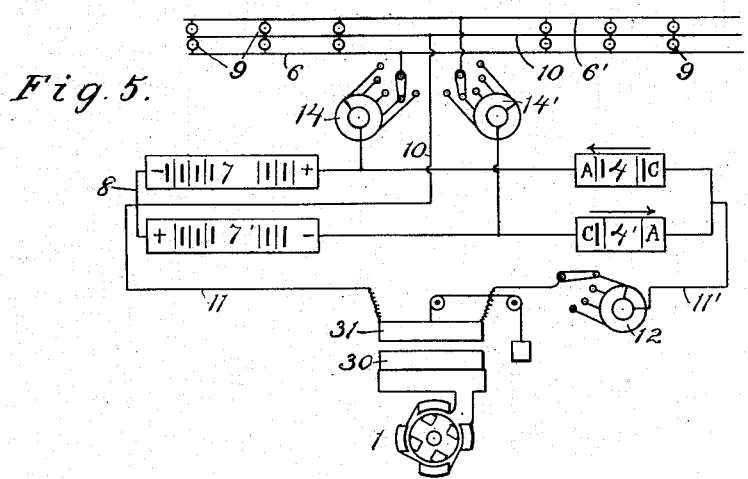
Figure 6:
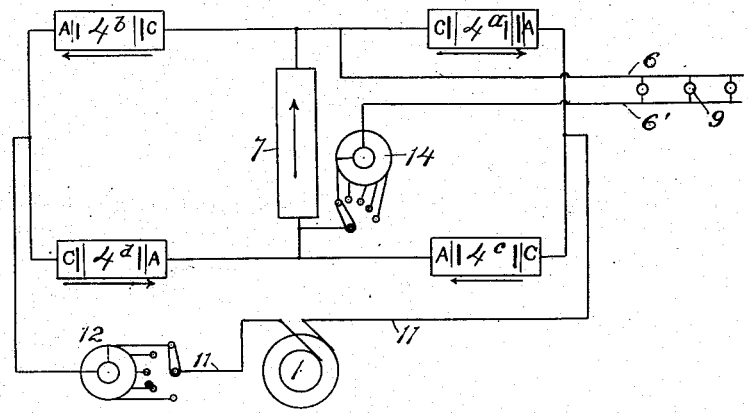

Fig. 5 shows the application of a transformer introduced between the alternator and the rectifying-circuits, such transformer being here shown as of the constant-current type, comprising relatively-movable coils 30 31, whose position is dependent on the electromagnetic conditions in the coils, so as to produce comparative constancy in the current in the secondary coil independently of the lead. This arrangement has certain advantages, particularly in preventing excessive currents under abnormal conditions. The alternator 1 is here shown as of the inductor type, having stationary armature-coils, so that in this case there are no moving contacts. Such an alternator can of course be used in connection with any of the arrangements above described. Regulatable choke-coils 14 12 are included in the working circuit 6 6' and in the supply connection 11 or 11' on either side, as above described.

As a further modification (shown in Fig. 6) four electrochemical rectifiers $4^a$ $4^b$ $4^c$ $4^d$ may be employed, arranged like the resistances in a Wheatstone bridge, with the alternator 1 connected by circuit 3 3' to the outer ends 33 34 of the bridge and the storage battery 7 and the work-circuit 6 6' connected in bridge-circuits between the two sides 35 36 of the bridge at points between the respective rectifying-cells in each side. These rectifying-cells are arranged to present opposing influences on each side of the bridge, and the directive influence of each cell is opposite to that of the corresponding cell on the other side of the bridge. As a result impulses can only pass through the storage battery and work-circuit in a given direction—say that indicated by the arrow—the arrows on the electrochemical devices then indicating the direction of permitted impulses in each cell.

I claim—

1. The combination with an alternating-current generator, of a consumption-circuit having its respective sides connected to one side of the alternating source, oppositely-directed electrochemical rectifying devices included in the connections to the respective sides of the consumption-circuit, a connection including translating devices, from the other side of the alternating source to one side of the consumption-circuit, and an exciting-coil for the alternating-current generator connected with the alternating generator through the electrochemical rectifying device on one side of the circuit.

2. The combination with a source of alternating current, of a work-circuit, connections, including oppositely-directed electrochemical rectifying devices, from one side of the alternating source to opposite sides of the work-circuit, connections including storage batteries from the respective sides of the work-circuit to the other side of the alternating source, and translating devices connected between the two sides of the work-circuit.

3. The combination with a source of alternating current, of a three-wire circuit, connections, including oppositely-directed electrochemical rectifying devices, from one side of the alternating source to the respective outer sides of the three-wire circuit, a connection from the other side of the alternating source to the intermediate wire of the three-wire circuit, and translating devices in the three-wire circuit.

4. The combination with a source of alternating current, of a three-wire circuit, connections, including oppositely-directed electrochemical rectifying devices, from one side of the alternating source to the respective outer sides of the three-wire circuit, a connection from the other side of the alternating source to the intermediate wire of the three-wire circuit, storage batteries connected in the three-wire circuit between the outer sides and the intermediate wire.

5. The combination with an alternating-current generator, of a divided circuit, connections, including oppositely-directed electrochemical rectifying devices, from one side of the alternating generator to the opposite sides of the divided circuit, exciting-coils for the alternating generator connected to said opposite sides of the divided circuit, and a return connection from such divided circuit to the other side of the alternating source.

6. The combination with a source of alternating current, of a consumption-circuit having its respective sides connected to one side of the alternating source, oppositely-directed electrochemical rectifying devices included in the connections to the respective sides of the consumption-circuit, and a connection, including translating devices, from the other side of the alternating source, to each side of the consumption-circuit, a regulating choke-coil being included in one of the connections, to the alternating source.

7. The combination with a source of alternating current, of a consumption-circuit including choke-coils, and having its respective sides connected to one side of the alternating source, oppositely-directed electrochemical rectifying devices included in the connections to the respective sides of the consumption-circuit, and a connection including translating devices from the other side of the alternating source to the respective sides of the consumption-circuit.

8. The combination of an alternate-current dynamo, a storage battery, a two-wire working circuit connected to the terminals of said battery, a connection from one pole of the dynamo to a point between the two batteries, electrochemical rectifying-cells connected in series, the terminals of the series connected to the outer terminals of the storage battery so as to oppose any flow of current from said battery through the rectifying-cells, and a connection from a point between the terminals of the series of rectifying-cells to the other pole of the dynamo.

9. The combination of a car-axle, an alternate-current dynamo driven thereby, a storage battery, a working circuit and an electrochemical rectifier in circuit between the dynamo and storage battery.

10. The combination of an alternate-current dynamo, a storage battery in circuit therewith, a working circuit, and an electrochemical rectifier and a choke-coil in circuit between the dynamo and storage battery.

11. The combination of an alternate-current dynamo, a storage battery in circuit therewith, a working circuit, an electrochemical rectifier and a choke-coil in circuit between the dynamo and storage battery, and means for regulating said choke-coil.

12. The combination of an alternate-current dynamo, a storage battery in circuit therewith, a working circuit, an electrochemical rectifier and a choke-coil in circuit between the dynamo and storage battery and a choke-coil in the working circuit.

13. The combination of an alternate-current dynamo, a storage battery in circuit therewith, a working circuit, an electrochemical rectifier and a choke-coil in circuit between the dynamo and storage battery and means for regulating said choke-coil, and a choke-coil in the working circuit.

14. The combination of an alternate-current dynamo, a storage battery in circuit therewith, a working circuit, an electrochemical rectifier and a choke-coil in circuit between the dynamo and storage battery, means for regulating said choke-coil, a choke-coil in the working circuit and means for regulating said choke-coil.

15. The combination of an alternate-current dynamo, a storage battery in circuit therewith, a two-wire working circuit connected to the terminals of said battery, a choking-coil in said working circuit, a connection from one pole of the dynamo to a point between the two battery-terminals, electrochemical rectifying-cells connected in series, the terminals of the series connected to the outer terminals of the storage battery so as to oppose any flow of current from said battery through the rectifying-cells, and a connection from a point between the terminals of the series of rectifying-cells to the other pole of the dynamo.

16. The combination of an alternate-current dynamo, a storage battery in circuit therewith, a two-wire working circuit connected to the terminals of said battery, a choke-coil in said working circuit, a connection from one pole of the dynamo to a point between the two battery-terminals, electrochemical rectifying-cells connected in series, the terminals of the series connected to the outer terminals of the storage battery so as to oppose any flow of current from said battery through the rectifying-cells, a connection from a point between the terminals of the series of rectifying-cells to the other pole of the dynamo and a choke-coil between dynamo and storage battery.

17. The combination of an alternate-current dynamo, a storage battery in circuit therewith, a two-wire working circuit connected to the terminals of said battery, a choke-coil in the working circuit, means for regulating said choke-coil, a connection from one pole of the dynamo to a point between the two battery-terminals, electrochemical rectifying-cells, connected in series, the terminals of the series connected to the outer terminals of the storage battery so as to oppose any flow of current from said battery through the rectifying-cells, a connection from a point between the terminals of the series of rectifying-cells to the other pole of the dynamo, a choke-coil between the dynamo and storage battery and means for regulating said choke-coil.

18. The combination of an alternate-current dynamo, a storage battery in circuit therewith, a three-wire working circuit connected to said battery, a connection from one pole of the dynamo to the center of the storage battery, electrochemical rectifying-cells connected in series, the terminals of the series connected to the outer terminals of the storage battery so as to oppose any flow of current from said battery through the rectifying-cells, and a connection from a point between the terminals of the series of rectifying-cells to the other pole of the dynamo.

19. The combination of an alternate-current dynamo, a storage battery in circuit therewith, a three-wire working circuit connected to said battery, choke-coils in the outer wires of the working circuit, a connection from one pole of the dynamo to the center connection of the storage battery, electrochemical rectifying-cells connected in series, the terminals of the series connected to the outer terminals of the storage battery so as to oppose any flow of current from said battery through the rectifying-cells, a connection from a point between the terminals of the series of rectifying-cells to the other pole of the dynamo, and a choke-coil between the dynamo and storage battery.

20. The combination of an alternate-current dynamo, a storage battery in circuit therewith, a three-wire working circuit connected to said battery, choke-coils in the outer wires of the working circuit, means for regulating said choke-coils, a connection from one pole of the dynamo to the center connection of the storage battery, electrochemical rectifying-cells connected in series, the terminals of the series connected to the outer terminals of the storage battery so as to oppose any flow of current from said battery through the rectifying-cells, a connection from a point between the terminals of the series of rectifying-cells to the other pole of the dynamo, a choke-coil between dynamo and battery, and means for regulating said choke-coil.

ALBERT S. HUBBARD.

Witnesses:
J. GREEN,
A. P. KNIGHT.